Figure 1:
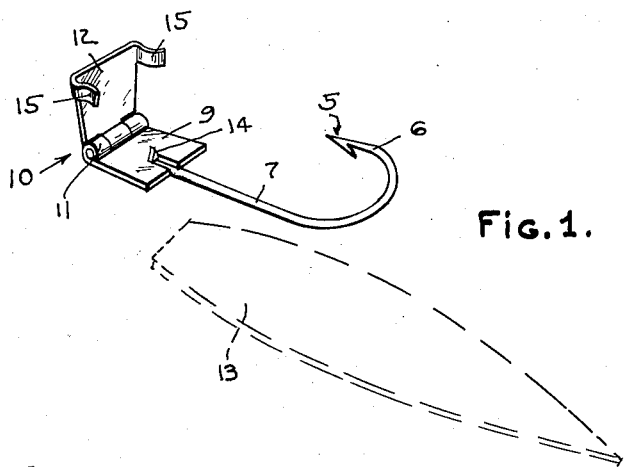

June 26, 1962     R. E. NORTON     3,040,467

BAIT ATTACHING MEANS FOR BARBED HOOKS

Filed March 15, 1961

INVENTOR.
ROBERT E. NORTON,
BY *James N. Lyles*
ATTORNEY

United States Patent Office 3,040,467
Patented June 26, 1962

3,040,467
BAIT ATTACHING MEANS FOR BARBED HOOKS
Robert E. Norton, 7925 NW. 1st Place, Miami, Fla.
Filed Mar. 15, 1961, Ser. No. 95,930
1 Claim. (Cl. 43—42.29)

This invention relates broadly to fish hooks and particularly to a clamping means fixedly connected to the hook whereby to clamp or hold both natural strip bait or artificial lures.

Trolling rigs or casting rigs have heretofore been provided where a leader wire or monofilament leader is attached to an eye of a conventional hook and in cases where a natural bait strip is employed, the strip is first engaged with the barbed portion of the hook and then extended forwardly to engage a free end of the leader as a means to hold the bait in a straight line forward of the hook during a trolling operation and to permit the bait to trail rearwardly of the hook. Such an arrangement has been used for a long time and has been relatively unsuccessful for the reason, that in a trolling action, the bait is being pulled through the water and finally disengages from the leader wire where it trails and becomes entangled or otherwise engaged with the barb of the hook to destroy any effective action in the water, thus the lure is activated in such a manner that a fish will not strike the bait, since the bait is not moving in a manner simulating a minnow or live fish.

The purpose of this invention is to provide a hinged clamp device having one leaf of the hinge welded, soldered or otherwise connected to the shank portion of the hook adjacent to the attaching eye. The clamp is quickly and easily opened to receive the end portion of a natural bait strip or to receive a metallic end portion of an artificial lure such as a feathered lure or a buck tail lure after which the clamp is firmly engaged with the lure or the bait and successfully prevents the disengagement of the bait or the lure during trolling or casting action of the device.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
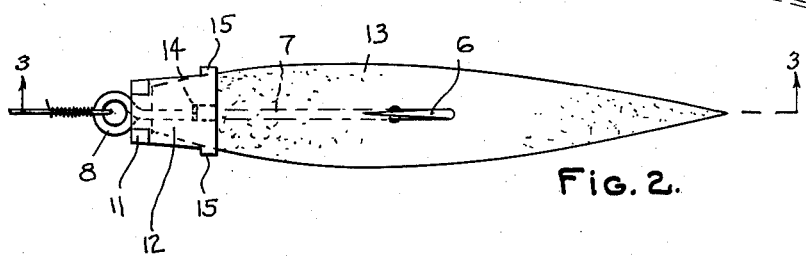
Figure 3:
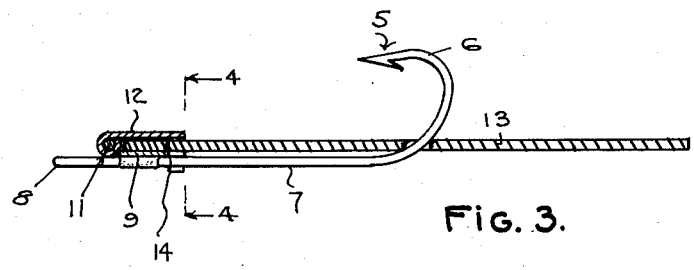
Figures 4, 5:
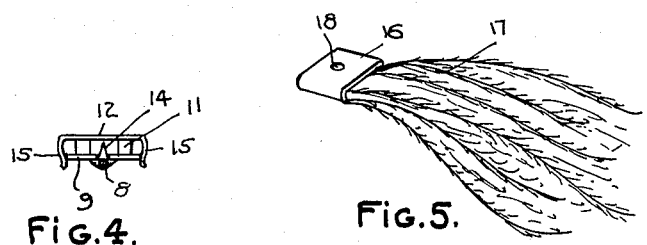

In the drawings:

FIGURE 1 is a perspective view of a fishing hook constructed in accordance with the invention and with a clamp means in an open bait receiving position, FIGURE 2 is a top plan view of the device having a natural strip bait connected thereto, FIGURE 3 is a longitudinal section taken substantially on line 3—3 of FIGURE 2, FIGURE 4 is a transverse section taken substantially on line 4—4 of FIGURE 3 and, FIGURE 5 is a perspective view of an artificial lure having means to support the lure in engagement with the clamp of this invention.

Referring specifically to the drawings, the numeral 5 indicates a fish hook of conventional design having a hooked barbed end 6 and a shank 7. The shank 7 terminates in a line attaching eye 8. The hook is of conventional construction.

Soldered, welded or otherwise attached to the shank 7 of the hook is a bottom plate 9 of a two-part clamp device, indicated as a whole by the numeral 10. The plate 9 is hingedly connected at 11 to a top clamping plate 12. The plates 9 and 12 therefore have a hinged connection so that the plate 12 may be swung to the open position as illustrated in FIGURE 1 to receive an end portion of the bait, such as an artificial bait strip 13 after which the plate 12 is swung downwardly to engage over the upper side of the bait strip 13. The plate 9 at its forward edge has been notched and struck upwardly to form a sharpened prong 14. The prong 14 is adapted to pierce that portion of the bait strip 13 that extends into the clamp device 10. Means are provided to hold the clamp 12 in overlying or clamping engagement with respect to the plate 9 and the bait 13 whereby the bait is held in a sandwiched manner between the plates 9 and 12 and impaled upon the prong 14 and for this purpose, the plate 12 at its forward corner portion is provided with spring tongues 15 that clip over the edges of the plate 9. Since all of the pull upon the bait is away from the clamp 10, the prong 14 will successfully hold the bait against slipping out of the clamp 10 and of course the bait 13 is also impaled upon the hook 6, as illustrated particularly in FIGURE 3. The clamp 10 is fixed upon the shank of the hook in such manner that the barbed end 6 will be vertically disposed and the clamp device, coupled with the engagement of the bait upon the hook will dispose the bait at a 90 degree angle to the hook.

In FIGURE 5, there has been illustrated a modified form of bait device, here illustrated as an artificial lure. The lure in this particular instance comprises a metallic ferrule 16, that receives the ends of feathers 17 or possibly hair such as the well known "bucktail"; the ferrule 16 being formed flat upon its upper and lower surfaces and is apertured at 18 for engagement over the prong 14.

In the use of the device, when a natural bait is to be employed, a strip 13 is cut from a bait fish in substantially the shape indicated. The bait is then engaged with the barbed end of the hook, by forcing the hook upwardly through the bait, as clearly shown in FIGURE 3. The bait is then pulled forward so that its front end is engaged upon the clamp plate 9 and forced downwardly on the prong 14 after which the plate 12 is swung downwardly upon the hinge 11, causing the tongues 15 to grip upon the opposite edges of the plate 9, holding the plate 12 in the overlying clamping position with respect to the bait 13 to prevent the bait from becoming accidentally dislodged from the clamp. The clamp prevents the bait from pulling off the hook from the pressure of the water in its forward movement or, when other objects, such as sea weed or the like might tear the bait away from the usual method of assembly. The clamp 10 is preferably colored, such as red, being thereby attracted to a fish. The mounting of the bait with the hook upstanding and the bait being disposed at a 90 degree angle with respect to the hook, will function to permit the bait to be drawn through the water and prevent it from twirling or rolling. Should the artificial lure be desirable in certain instances, the operator may quickly and easily remove the bait 13 and substitute the lure having the feather 17 by merely engaging the aperture 18 over the prong 14 and then clamping the plate 12 downwardly over the ferrule 16. The feathers 17 or hair as the case may be, will extend rearwardly and embrace the hook in the usual and well known manner. The device thus offers a bait or lure attaching means that is extremely simple, cheap to manufacture, is strong, durable, permits the use of both natural and artifical bait means that may be substituted one for the other in a minimum of time.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A fish hook and bait clamp assembly comprising a one-piece fish hook including an elongated shank having a reverse-bend portion including a terminal barb portion at one end and a terminal eye portion at the other end, said terminal eye portion being substantially normal to a plane passing through said reverse-bend portion, and a bait clamp device secured to said shank and comprising a bottom plate fixedly secured transversely in overlying relation to said shank and having one end immediately adjacent and forward of said eye portion in substantially parallel relation thereto, said bottom plate including a single prong extending vertically from a central upper surface portion thereof in the direction which said reverse-bend portion extends from said shank, a top plate hingedly connected at one end to said one end of said bottom plate on an axis transversely of said shank and parallel to said eye portion, said top plate including a pair of opposed spring fingers depending from opposed side edges of said top plate forwardly of said prong and displaceably engaging underlying side edges of said bottom plate with the terminal end of said prong engaging the undersurface of said top plate, the opposite ends of said plates being substantially spaced from said reverse-bend portion and being maintained in spaced relation from each other by said prong and spring fingers and forming a smooth, uninterrupted opening the width of said plates whereby a bait can be readily impaled on said single prong and barb portion and a line secured to said eye portion imposes no tension on said bait.

References Cited in the file of this patent
UNITED STATES PATENTS

| | | |
|---|---|---|
| 1,264,626 | Foss | Apr. 30, 1918 |
| 1,731,161 | Farley | Oct. 8, 1929 |
| 1,750,783 | Pemberton | Mar. 18, 1930 |
| 2,659,996 | Hegler | Nov. 24, 1953 |
| 2,676,375 | Robertson | Apr. 27, 1954 |